United States Patent [19]

Michel et al.

[11] 4,232,128
[45] Nov. 4, 1980

[54] POROUS SHAPED CELLULOSE HYDRATE ARTICLE WITH AN IMPROVED CLEANING EFFECT

[75] Inventors: Wolfgang Michel, Wiesbaden; Heinz Kälberer, Walluf, both of Fed. Rep. of Germany

[73] Assignee: Hoechst Aktiengesellschaft, Frankfurt am Main, Fed. Rep. of Germany

[21] Appl. No.: 860,903

[22] Filed: Dec. 15, 1977

[30] Foreign Application Priority Data

Dec. 16, 1976 [DE] Fed. Rep. of Germany ....... 2656968

[51] Int. Cl.² .............................................. A47L 13/16
[52] U.S. Cl. ................................. 521/134; 15/209 R; 15/244 C; 260/17 R; 428/283; 428/402
[58] Field of Search ............ 260/17 R; 428/288, 361, 428/283, 402, 297; 15/244 C, 209 R; 521/134

[56] References Cited

U.S. PATENT DOCUMENTS

| | | | |
|---|---|---|---|
| 3,219,601 | 11/1965 | Koontz | 260/17 R |
| 3,317,367 | 5/1967 | Koller | 428/97 |
| 3,409,927 | 11/1968 | Hider et al. | 15/209 R |
| 3,591,536 | 7/1971 | Fakuma et al. | 260/17 R |
| 3,929,693 | 12/1975 | Hochberg | 260/17 R |
| 3,950,293 | 4/1976 | Sander et al. | 260/17 R |
| 3,974,319 | 8/1976 | Alibeckoff | 428/283 |

FOREIGN PATENT DOCUMENTS

| | | |
|---|---|---|
| 4411036 | 5/1969 | Japan ............. 260/17 R |
| 1052218 | 12/1966 | United Kingdom . |
| 1390240 | 4/1975 | United Kingdom . |

Primary Examiner—James J. Bell
Attorney, Agent, or Firm—Schwartz, Jeffery, Schwaab, Mack, Blumenthal & Koch

[57] ABSTRACT

A porous shaped article, especially a flat shaped sponge like article, in particular a sponge cloth, is disclosed which exhibits an improved cleaning effect and which comprises cellulose hydrate and from about 10 to about 80% by weight of polyolefin fibrids.

15 Claims, 1 Drawing Figure

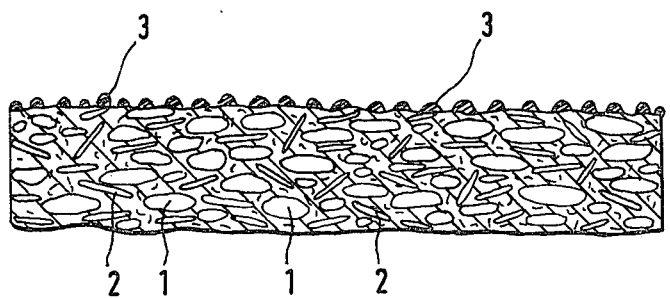

POROUS SHAPED CELLULOSE HYDRATE ARTICLE WITH AN IMPROVED CLEANING EFFECT

BACKGROUND OF THE INVENTION

The present invention relates to a porous shaped article of cellulose hydrate with an improved cleaning effect, especially a sponge cloth, and to a process for its manufacture.

Processes for preparing porous shaped articles of cellulose hydrate are known in the art. For this purpose, cellulose is first converted into viscose. In order to cause the formation of pores, a pore forming agent, such as salt grains, e.g. crystals of Glauber's salt of appropriate grain size are usually incorporated into the viscose, and, if desired, reinforcing fibers, e.g. cotton fibers of 12 to 15 mm length, may be incorporated as well. Then the mass is coagulated in a coagulating bath under the influence of heat, e.g. is precipitated in a water bath at approximately 100° C. In case of preparing a flat shaped porous article, a layer of the mass advantageously is applied to an endless belt, by means of which it is introduced into the coagulating bath. In the water bath, a major portion of pore forming agent is eliminated, e.g. the salt is dissolved and washed away. The porous shaped article then passes through a regenerating bath containing aqueous sulfuric acid and, if appropriate, a chlorite bleaching bath. Next follows a washing step where the porous shaped article is throughly washed with water. Then it is dried. After drying, it may be cut to the desired size. Colored shaped articles are produced by adding dyes and color brighteners, which are mixed with the viscose.

Further, it has already been suggested to supply the heat required for quick coagulation by high frequency radiation or by infra-red radiation, or to use a crystalline salt containing water of crystallization, e.g. trisodium phosphate, in place of Glauber's salt. However, these suggestions did not find acceptance in the praxis of manufacturing sponges and sponge cloths.

SUMMARY OF THE INVENTION

It is the object of the present invention to provide a porous shaped article, especially a sponge cloth, which has an improved cleaning effect. In particular it is an object of the present invention to provide such a shaped article which has an improved wiping effect on greasy or water-repellent surfaces, in particular a flat shaped sponge or a sponge cloth, and by means of which the occurrence of streaks, stripes, and other traces of wiping can be prevented.

It is a further special object of the present invention to provide such a shaped article in the form of a sponge cloth of improved mechanical strength, in particular a sponge cloth which exhibits properties which are similar to those of chamois leather.

In order to accomplish the foregoing objects according to the present invention, there is provided a porous shaped article, preferably a flat shaped sponge like article, in particular a sponge cloth, with an improved cleaning effect comprising cellulose hydrate and from about 10 to about 80% by weight of polyolefin fibrids.

Preferably, the polyolefin fibers comprise a low pressure polyethylene.

In order to provide a rougher surface, particles of a synthetic polymer having an average diameter of from about 0.1 to about 2 mm may be attached onto at least part of the surface of the porous shaped article.

According to the present invention, there is further provided a process for preparing the above defined porous shaped article which comprises the steps of
 (a) incorporating into viscose a pore forming agent and an amount of polyolefin fibrids which is sufficient to form a viscous mixture comprising from about 10 to about 80% by weight of the polyolefin fibrids relative to its total solid content,
 (b) introducing the viscous mixture into an aqueous coagulating liquid and subjecting it to a sufficient heat treatment to form a porous coagulated shaped article comprising the polyolefin fibrids and the viscose in the gel state.
 (c) treating the porous shaped article in the gel state with at least one regenerating liquid,
 (d) washing the treated porous shaped article, and
 (e) drying the washed porous shaped article.

Further objects, features and advantages of the present invention will become apparent from the detailed description of the invention and its preferred embodiments, which follow, when considered together with the accompanying figures of the drawing.

BRIEF DESCRIPTION OF THE DRAWINGS

The FIGURE of the drawing is a schematic view of a cross section of a flat shaped porous article according to the invention.

DETAILED DESCRIPTION OF THE INVENTION

Surprisingly, it was found that a porous shaped article of cellulose hydrate displays an improved cleaning effect if it contains polyolefin fibrids, in place of or in addition to the known reinforcing fibers.

According to a preferred embodiment of the invention, the porous shaped article is a sponge-like flat shaped article such as a sponge cloth.

The fibrids to be used according to the invention preferably have a medium size length, classified according to standard norms, i.e., according to TAPPI standard T 233 SK 64. For example, particularly suitable fibrids may exhibit an average fiber length of from about 0.05 to about 15 mm, preferably from about 1.0 to about 3.0 mm. Their specific surface, as determined according to the BET standard method, is larger than 1 $m^2/g$, preferably between about 1 and about 100 $m^2/g$, and especially from about 5 to about 25 $m^2/g$. The BET method is described by Brunauer, Emmer and Teller in J. Am. Chem. Soc., 60, 309 (1938).

The fibrids to be used according to the invention preferably are comprised of from about 97 to about 99.95 percent by weight, preferably from about 99 to about 99.90 percent by weight, of a polyolefin, and of from about 0.05 to about 3.0 percent by weight, preferably from about 0.1 to about 1.0 percent by weight, of a surface-active, hydrophilic organic compound.

Within the present specification and claims, the term "polyolefin" is meant to denote homo- and copolymers of lower alkylenes and copolymers of lower alkylenes and a minor portion of unsaturated monomers copolymerisable therewith, e.g. vinyl derivatives and acrylic acid derivatives.

Particularly suitable polyolefins are homopolymers and copolymers of lower olefins. Polymers of ethylene, propylene, and/or butene-1 obtainable by a conventional low-pressure process are preferred. Copolymers of ethylene or propylene with small amounts of other monomers, e.g. vinyl esters or acrylic acid derivatives, may also be used. Low-pressure polyethylene is particularly preferred.

The surface-active hydrophilic organic compound preferably is of high molecular weight. Examples of suitable compounds are starch, methyl cellulose, carboxy methyl cellulose, polyalkylene oxides, and polyvinyl alcohol. Polyvinyl alcohols with a degree of saponification of from about 60 to about 99.9 percent and a viscosity of from 4 to about 90 cP (4% solution in water of 20° C.) are particularly advantageous.

Various processes for the preparation of the polyolefin fibrids are known in the art, e.g. spraying of a superheated polymer solution, or of a superheated emulsion of a polyolefin solution and an aqueous solution of the surface-active, hydrophilic compound through an appropriate nozzle. The particularly preferred polyolefin fibrids are obtained by flash evaporation of a superheated emulsion comprising a solution of a polyolefin in a low molecular weight hydrocarbon and an aqueous solution of the surface-active hydrophilic compound. The process may be conducted according to the method described in the German Offenlegungsschrift No. 24 11 589, the disclosure of which is hereby incorporated by reference, e.g. in the following manner:

A 250 l tank provided with a stirrer and an outlet valve which is connected by means of a pipe to a nozzle leading into a flash chamber, is filled with 9.6 kg of polyethylene (RSV 1.4 dl/g, MFI+5.58), 120 l of water, 96 g of polyvinyl alcohol (viscosity of a 4% solution in water at 20° C.:4.6 to 6 cP; saponification degree: 98.5 to 100% (mol.) ) and 120 l of hexane. The tank is then closed and its contents is heated to 150° C. while stirring, and maintained at this temperature for about 2½ hours.

+ (MFI (melt flow index) 190/2 according to ASTM D 1238−−62T=5.58) The pressure rises to 12.3 kg/cm². After the polyethylene has dissolved and the contents of the tank have changed into an emulsion, the outlet valve is opened and the emulsion is allowed to pass over into the flash chamber at the rate at which a vacuum pump connected with the flash chamber can suck off the released vapors and maintain a pressure of about 200 mm Hg. The fibrids thus obtained are moistened with water to form a paste, passed seven times through a disc refiner, and then freed from water by centrifuging. The resulting fibrids have a specific surface, according to the BET method, of 8.2 m²/g and a classified length, according to TAPPI standard T 233 SU 64, of 0.9 mm.

Alternatively, suitable polyolefin fibrids may be produced according to the process described in German Offenlegungsschrift No. 22 49 604, the disclosure of which is hereby incorporated by reference. Prior to the flash evaporation of the polymer mixture, fillers or pigments, e.g. alumina, calcium carbonate, dolomite, or titanium dioxide may be added to the fibrids. Hydrophobized fillers or pigments are preferred. Suitable hydrophobizing agents are, e.g., fatty acids, fatty acid amines or amides, and silicones.

For performing the inventive process of preparing the shaped article, the fibrids are added to the viscose prior to coagulation, either in the dry or the wet state, e.g. in the water-wet state in which they are obtained by the preferred flash evaporation process.

The amount of fibrids in the solids content of the viscous mixture is from about 10 to about 80 percent by weight, preferably between about 20 and about 40 percent by weight.

The porous shaped article is then prepared from the resulting viscous mixture in a conventional manner.

Within the present specification the term "viscose" is intended to denote the viscous reaction product which is conventionally obtained within the conventional xanthate process by treating cellulose with an aqueous sodium hydroxide solution and carbon disulphide.

Within the present specification the term "pore forming agent" is intended to denote a compound which under the coagulating conditions is removed from the coagulated shaped article by means of reaction with the coagulating liquid, thereby causing the formation of pores in the coagulated shaped article. Preferred pore forming agents are grains of water soluble salts, e.g. crystals of Glauber's salt of an appropriate grain size, the major portion of which is dissolved and washed away in the aqueous coagulating liquid. Conventional coagulating liquids, preferably water, and precipitating and regenerating liquids are used, e.g. conventional aqueous solutions comprising varying amounts of sulfuric acid, e.g. aqueous solutions of $H_2SO_4$ and $Na_2SO_4$ which are known in the art under the name of "Mullerbath". During the coagulation sufficient heat is supplied to provoke a rapid coagulation, e.g., coagulation may take place in a coagulating bath of about 100° C. Advantageously the viscous mixture is applied to an endless belt by means of which it is introduced into the coagulating bath. The coagulated shaped body is subsequently passed through at least one regenerating bath and a washing bath and the washed shaped body is then dried in a conventional manner, e.g. by heat provided by hot air.

Even with a high proportion of fibrids, the mechanical strength of the shaped article according to the invention is satisfactory for most applications. In order to further improve its mechanical and cleaning properties, the shaped article according to the invention may be smoothed, embossed, or deformed by the application of heat and pressure. For this purpose, a heated roller provided with an appropriate surface may be used. By this after-treatment, the shaped article is solidified and its mechanical properties, such as its tearing strength and resistance to piercing, are improved. The properties of the smoothed, shaped article according to the invention, especially if it is in the form of a sponge cloth, resemble those of chamois leather. When the porous shaped article according to the invention is used for wiping over greasy surfaces, no streaks, stripes and other wiping traces are formed. Due to its high absorption capacity for hydrophilic and lipophilic substances, the shaped article according to the invention is particularly suitable for cleaning water-repellent surfaces and for removing stains.

According to an embodiment of the present invention, the shaped article may further comprise particles of a synthetic polymer having an average diameter of from about 0.1 to about 2.0 mm which are anchored to its surface in a conventional manner in order to increase its abrasive action. Preferably, the particles are sintered by heat action, so that the surface of the shaped article acquires a certain roughness. Preferably the plastic particles on the surface of the shaped article consist of the same material as the incorporated fibrids. A polyethylene powder, e.g. "Flamulit SW PE B" (registered trademark) may be used as the particulate synthetic polymer material; it may be colored, if desired. Shaped articles, e.g. sponge clothes which comprise plastic particles anchored to its surface are especially useful when particularly tenacious dirt has to be removed.

Porous shaped articles according to the invention not only comprise sponge cloths, but also differently shaped sponges and the like.

The figure in the drawing is a cross-section of a part of a sponge cloth according to the above mentioned embodiment of the invention, comprising pores 1, polyolefin fibrids 2, and plastic particles 3 sintered onto one of its surfaces. These details and the thickness of the sponge cloth are not shown true to scale.

What is claimed is:

1. A porous shaped article comprising cellulose hydrate and polyolefin fibrids wherein said fibrids are present in an amount from about 10 to about 80 percent by weight of the shaped article.

2. The porous shaped article as defined in claim 1, comprising from about 20 to about 40 percent by weight of polyolefin fibrids.

3. The porous shaped article as defined in claim 1, wherein the polyolefin fibrids have an average length of from about 0.05 to about 15 mm.

4. The porous shaped article as defined in claim 3, wherein the polyolefin fibrids have an average length of from about 1 to about 3 mm.

5. The porous shaped article as defined in claim 1, wherein the polyolefin fibrids are comprised of a polymer selected from the group consisting of a homopolymer of a lower alkylene and a copolymer of at least two lower alkylenes.

6. The porous shaped article as defined in claim 5, wherein the lower alkylene is ethylene, propylene or butene-1.

7. The porous shaped article as defined in claim 1, wherein the polyolefin is a copolymer of a major portion of an olefin selected from the group consisting of ethylene and propylene and a monomer selected from the group consisting of vinyl esters and acrylic acid derivatives.

8. The porous shaped article as defined in claim 7, wherein the polyolefin is a low-pressure polyethylene.

9. The porous shaped article as defined in claim 1, wherein the polyolefin fibrids have a specific surface of more than about 1 $m^2/g$.

10. The porous shaped article as defined in claim 9, wherein the specific surface is from about 1 to about 100 $m^2/g$.

11. The porous shaped article as defined in claim 10, wherein the specific surface is from about 5 to about 25 $m^2/g$.

12. The porous shaped article as defined in claim 1, wherein the polyolefin fibrids further comprise an amount of from about 0.05 to about 3.0 percent by weight, of a surface-active hydrophilic organic compound, relative to the weight of the fibrids.

13. The porous shaped article as defined in claim 12, wherein the amount of the surface active compound is from about 0.1 to about 1.0% by weight.

14. The porous shaped article as defined in claim 1, further comprising particles of a synthetic polymer having an average diameter of from about 0.1 to about 2 mm attached to at least a portion of its surface.

15. The porous shaped article as defined in claim 1, which is in the form of a sponge cloth.

* * * * *